United States Patent
Magnussen et al.

(10) Patent No.: US 6,909,713 B2
(45) Date of Patent: Jun. 21, 2005

(54) HASH-BASED DATA FRAME DISTRIBUTION FOR WEB SWITCHES

(75) Inventors: Andreas Magnussen, Fredensborg (DK); Jacob Schroeder, Lyngby (DK)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 09/947,260

(22) Filed: Sep. 5, 2001

(65) Prior Publication Data

US 2003/0043825 A1 Mar. 6, 2003

(51) Int. Cl.[7] ............................................... H04L 12/28
(52) U.S. Cl. ..................... 370/389; 370/401; 711/216
(58) Field of Search ................... 370/401, 389, 370/747, 471; 711/216, 202

(56) References Cited

U.S. PATENT DOCUMENTS

| | | | |
|---|---|---|---|
| 5,914,938 A | 6/1999 | Brady et al. | |
| 6,084,877 A | 7/2000 | Egbert et al. | |
| 6,233,242 B1 | 5/2001 | Mayer et al. | |
| 6,249,521 B1 | 6/2001 | Kerstein | |
| 6,570,875 B1 * | 5/2003 | Hegde | 370/389 |
| 6,625,161 B1 * | 9/2003 | Su et al. | 370/415 |
| 2002/0054567 A1 * | 5/2002 | Fan | 370/230 |
| 2003/0023846 A1 * | 1/2003 | Krishna et al. | 713/162 |

* cited by examiner

*Primary Examiner*—Duc Ho
(74) *Attorney, Agent, or Firm*—Blakely, Sokoloff, Taylor & Zafman LLP (57) ABSTRACT

A method and apparatus for receiving data having an address at a network switch having at least one protocol processor, and hashing at least part of the address to obtain an identifier of a protocol processor in the switch. Source address preservation may be used so that data transfers between server and client may be distributed to the same protocol processor in a switch or web appliance by hashing the same address regardless of which header field the address resides in.

25 Claims, 10 Drawing Sheets

700 Hash Table

| IP Address | Interface Address | Example Hash of IP Address | Protocol Processor Assigned to Address |
|---|---|---|---|
| 172.16.30.205 | E0 | 0,1 | 2 |
| 172.16.30.204 | E2 | 0,0 | 1 |
| 172.16.30.203 | E2 | 1,0 | 3 |
| 172.16.30.202 | E2 | 1,1 | 4 |
| 172.16.30.201 | E2 | 0,0 | 1 |
| 172.16.30.200 | E2 | 0,1 | 2 |
| 172.16.30.199 | E3 | 0,1 | 2 |

Fig. 10

HASH-BASED DATA FRAME DISTRIBUTION FOR WEB SWITCHES

The present invention relates generally to computer network switching, and more specifically to a method and apparatus for distributing data frames to protocol processors within network switches and web appliances.

BACKGROUND

According to the Open Systems Interconnection (OSI) model, the OSI data link layer of the Internet translates data packets from the OSI network layer into bits for the OSI physical layer to transfer. The data packets received by the data link layer have Internet Protocol (IP) headers containing the software IP addresses of the sending and receiving hosts. The data link layer performs the translation from network layer to physical layer by encapsulating the network layer data packets with data frames, adding customized headers containing the Logical Link Control (LLC) and Media Access Control (MAC) source and destination physical hardware addresses ("MAC addresses") from Network Interface Cards (NICs) installed in the sending and receiving devices.

Computer network switches and web appliances (collectively "switches") operate on the data link layer and use the MAC addresses stored in data frames to filter the data frames to their proper destinations. When a switch is activated, a MAC address filter table in the switch is empty. As the switch reads the frame of each incoming data packet for MAC addresses, an Application-Specific Integrated Circuit (ASIC) within the switch builds the above mentioned internal filter table of source MAC addresses and corresponding input ports. The filter table tells the switch where the sending device for each data packet is located. Since the MAC addresses referenced by switches are stored in header fields in the data frames that encapsulates the data packets rather than in the network layer header fields of the data packets, switches are typically faster and more reliable than routers because switches do not modify the data packet, only the data frame. The term "data packet" will be used to refer to data, data packets, and framed data packets.

There is a limit to the amount of data traffic that a given ASIC can process. In a large switch, several ASICs may be needed, and data traffic must be forwarded to the correct ASIC. Since a single ASIC usually has the state information for a given Transmission Control Protocol (TCP) connection, data packets proceeding through that TCP connection should always be directed to the same ASIC. In other words, communication between a client and server should always be forwarded to the same ASIC. This is typically done by performing a flow dependent "lookup," which requires intensive communication between the entity performing the lookup and the TCP layer.

ASICs in switches may be replaced by or used in combination with other general purpose or hybrid protocol processors. Generally, protocol processors may include any combination of ASICs, protocol processing hardware, protocol processing software, subcomponents, and/or subroutines (collectively "protocol processors"). A protocol processor may also be one or more parts of a single physical or logical protocol processor. Large web switches may use numerous protocol processors in a single switch.

Hash functions are often used in the transmission of data, including the transfer of data packets on a network, to verify data integrity or to store data packets for rapid retrieval. A hash function converts a string of characters into a shorter string or number. Performing an XOR operation on a data item is one example hash function. As a data storage method, hashing stores data items at locations that are determined by a mathematical function of the data, for example, dividing the value of a data item by the number of storage locations available and using the remainder of the division as an address to store the data item. Hashing allows quick retrieval of stored data since it is not necessary to search through a list to find one item.

Several U.S. patents are directed to hashing in the context of a network switch. U.S. Pat. No. 6,249,521 to Kerstein is directed to a network switch configured for switching data packets to network addresses across multiple ports using hash keys and an address table to generate frame forwarding information. U.S. Pat. No. 6,233,242 to Mayer et al. is directed to a network switch that uses hash logic to find identification entries in a central memory that include addresses of network devices. U.S. Pat. No. 6,084,877 to Egbert et al. is directed to a network switch that uses a hash generator and an address table configured to include a programmable number of bin entries to perform switching to network addresses. U.S. Pat. No. 5,914,938 to Brady et al. is directed to an address table search unit that may use a number of hash buckets to retrieve a pointer to a network device, such as a virtual LAN. Although these references use hashing to send data packets to network IP addresses outside a network switch, none of the references disclose solutions to problems encountered in distributing data packets to entities inside a network switch.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

In a typical computer network switch, data traffic for a particular TCP connection is handled by a specific protocol processor. In a TCP/IP context, protocol processors contain TCP termination and higher protocol layers. Data packets from the client and server for a given TCP connection must be forwarded to the same protocol processor. But TCP terminator protocol processors are able to process only a limited amount of data traffic. In large switches there is a need for several protocol processors and data traffic must be forwarded to the correct one. Data packets are directed to a specific protocol processor based on the flow state, for example by a lookup between the filter table and the TCP layer. It would be advantageous in switches and web appliances that have numerous protocol processors to use a simple non-state method to determine the specific protocol processor that a data packet should be directed to.

The present invention is a method and apparatus to facilitate the distribution of data packets to protocol processors within switches. In one example embodiment, when data frames are sent from a client to a server, a novel classifier in the switch hashes at least part of the source address, for example the client's address residing in a header field for the source IP address, to determine which protocol processor to direct the data frames to. When data frames are sent in the other direction, from server to client, the classifier performs source address preservation and still hashes the client's address to determine which protocol processor to direct the data frames to, even though the client's address may now reside in a different header field of the data frame, such as a header field for the destination IP address. Thus, the same address, in this case the client's address, is hashed to direct data frames to the same protocol processor, regardless of which header field the address resides in.

The invention is generally usable for directing data traffic and for load distribution between protocol processors used in switches and web appliances. Although one embodiment of the invention is for Internet TCP/IP using any standard switch electronics, hardware components, and/or software (collectively "fabric") for switching IP packets, the invention can also work with any network protocol.

Figure 1:
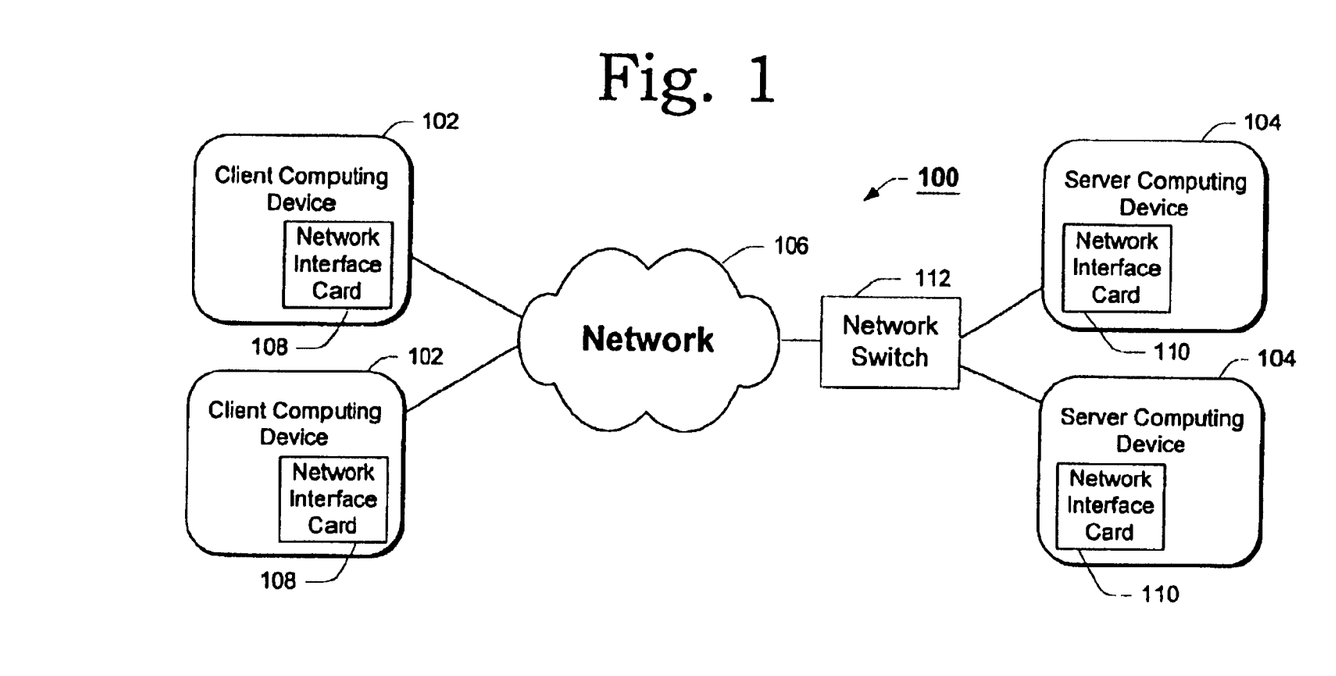
FIG. 1 is a block diagram of an example data network.

FIG. 1 shows an example data network configuration in which the invention may be practiced. The computing network 100 depicts client computing devices 102 and server computing devices 104 having NICs 108, 110 coupled to a network 106. A switch 112 is shown within the computing network configuration 100 on the server side of the network 106. The shown computing network 100 is only one example and the invention may be practiced on computing networks having other configurations.

Figure 2:
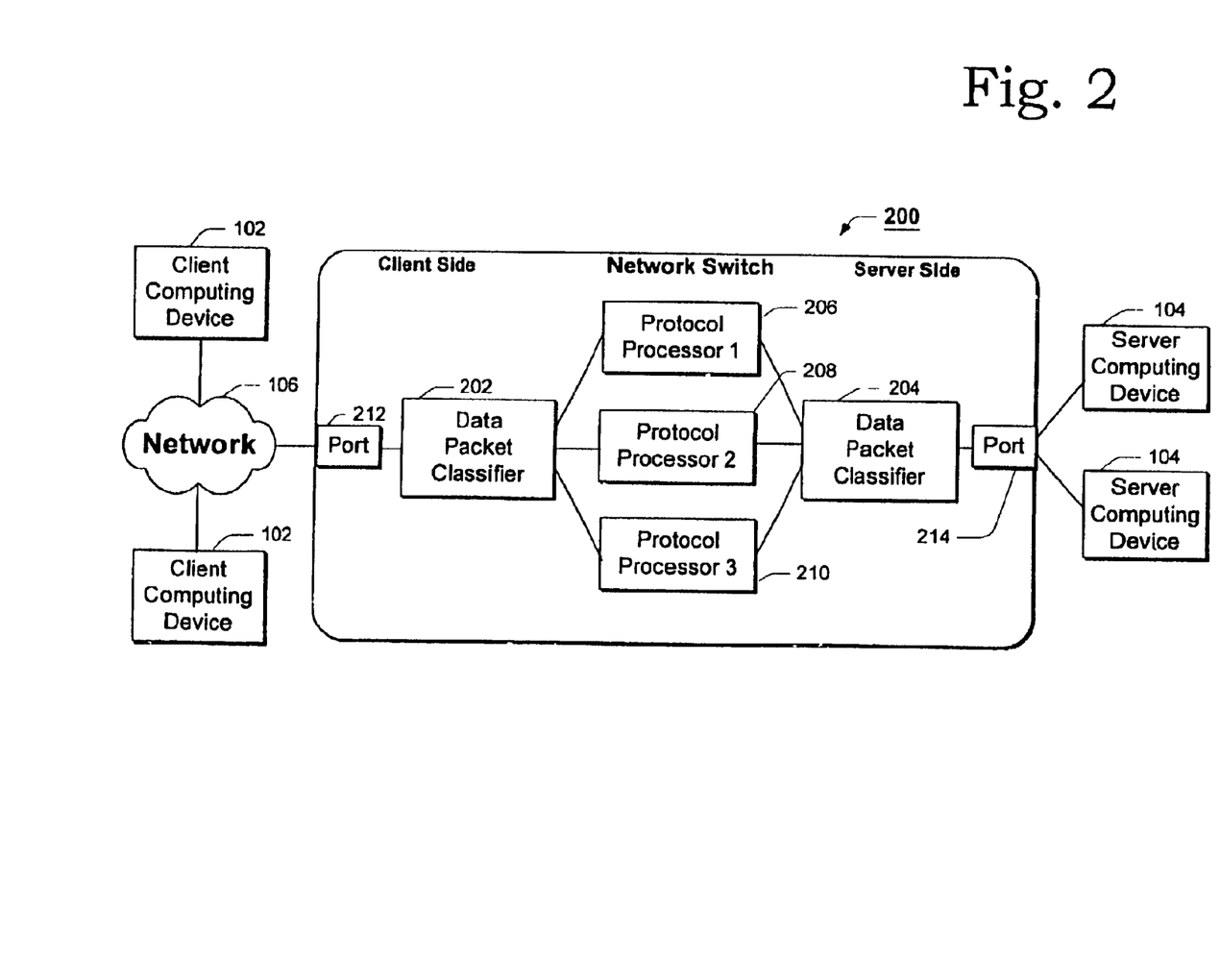
FIG. 2 is a block diagram of a data network having a network switch incorporating a first embodiment of an innovative data packet classifier.

FIG. 2 shows a first example switch 200 incorporating the present invention coupled to a network as in FIG. 1. A classifier 202 is coupled to a client side port 212 on the client side of the switch 200. The client side port 212 is coupled to a network 106 such as the Internet. Another classifier 204 is coupled to a server side port 214 that is coupled to at least one server 104. Although the shown embodiment depicts two classifiers 202, 204, any number of classifiers may be used in a switch 200. The two shown classifiers 202, 204 may also represent one classifier split into two parts on a NIC, or the two classifiers 202, 204 may represent a single unsplit classifier. The classifiers 202, 204 are coupled to protocol processors 206, 208, and 210. Although three protocol processors are shown to illustrate a plurality of protocol processors, the present invention may be used with any number of protocol processors, including a single protocol processor, in at least one switch 200. Likewise, the present invention may be practiced in a switch 200 containing one or more ports 212, 214. Separate classifiers 202, 204 may be used with each port 212, 214, or a plurality of ports may be coupled to a single classifier or to a limited number of classifiers.

Figure 3:
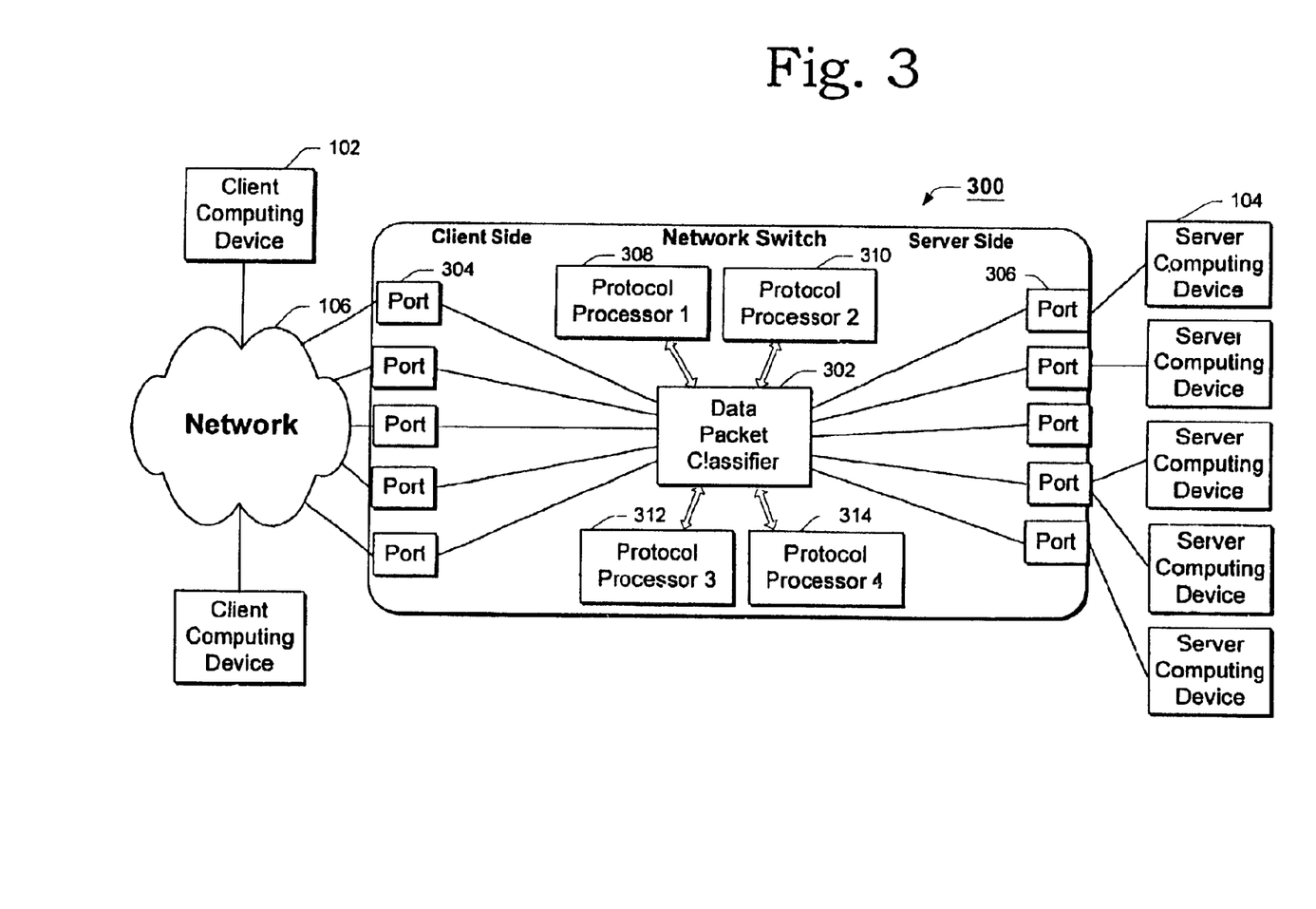
FIG. 3 is a block diagram of a data network having a network switch incorporating a second embodiment of an innovative data packet classifier.

FIG. 3 shows a second example switch 300 incorporating the present invention. In the second example switch 300 a single classifier 302 is coupled to a plurality of client side ports 304 and server side ports 306. The classifier 302 is also coupled to protocol processors 308, 310, 312, and 314. In one example data exchange, the classifier 302 receives data packets over a network 106 from one of the client computing devices 102 and hashes the client's IP address to determine or calculate an identifier for one of the protocol processors 308, 310, 312, and 314. It should be noted that "protocol processor" may refer to a unique part of a single physical or logical protocol processor. Therefore, in some switches incorporating the present invention, an identifier for a protocol processor may be a software address rather than a hardware address, or an identifier may contain elements of both a hardware address and a software address.

The classifier 302 then directs the data packet to one of the protocol processors 308, 310, 312, and 314. The selected protocol processor 308 determines the IP address of a destination server for each packet and sends each packet to a proper port 306. When a destination server 104 responds to a client 102, the classifier 302 hashes the client IP address stored in the data packet from the server 104 and directs the data packet to the appropriate protocol processor. Accordingly, the present invention directs all data flow in a connection between a server and client using the same protocol processor.

Figure 4:
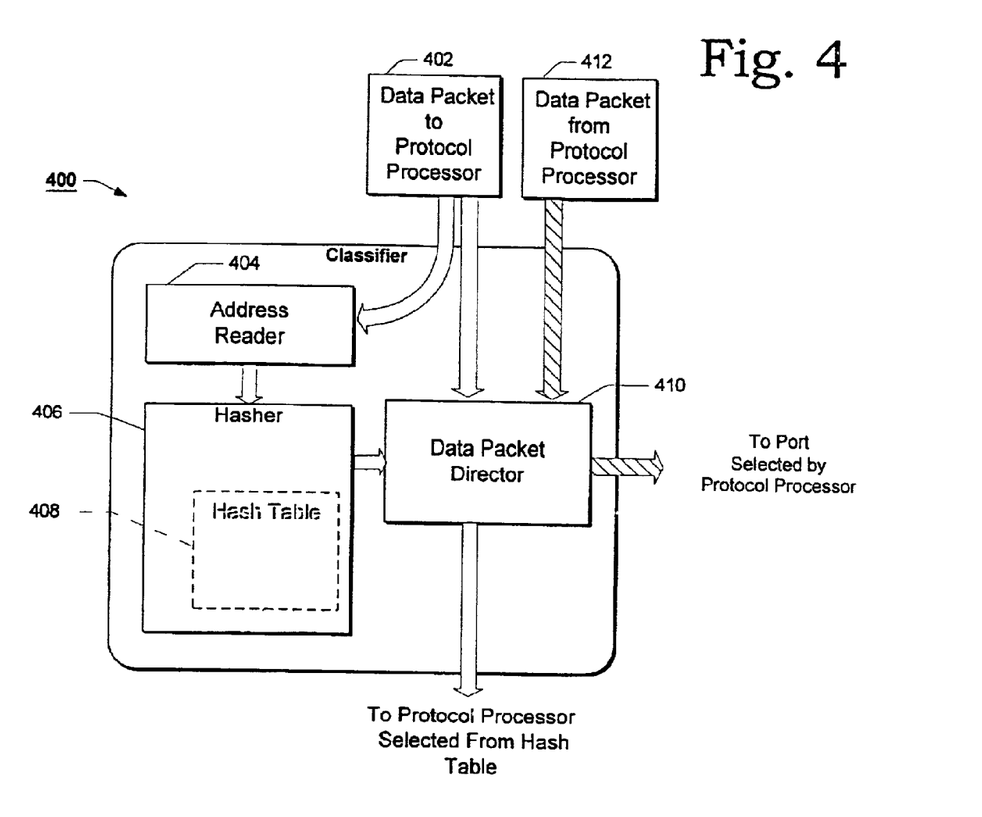
FIG. 4 is a block diagram of one embodiment of an innovative data packet classifier of the present invention.

FIG. 4 shows a classifier 400 embodiment of the present invention. A data packet 402 en route to a protocol processor in a switch is received by the classifier 400. In one embodiment, an IP address such as the client's IP address is read by an address reader 404. Although in one embodiment a (software) IP address is read by the present invention, in other embodiments a hardware address may be used by the present invention to direct data packets. A hasher 406 performs a hash function on the address and returns a hash value. There is no limit to types of hash functions that may be used by the present invention. Accordingly, a particular hash function may directly return an identifier such as a hardware address for one of the protocol processors in a switch. Alternately, an optional hash table 408 may be used to relate an address from a data packet to a protocol processor. A data packet director 410 consisting of standard switch fabric or any other data packet directing means transfers the data packet to the protocol processor having the identifier determined or calculated by the hasher 406. A classifier 400 may also direct data packets 412 leaving a protocol processor to a designated port or other destination by using, for example, a data packet director 410.

Figure 5:
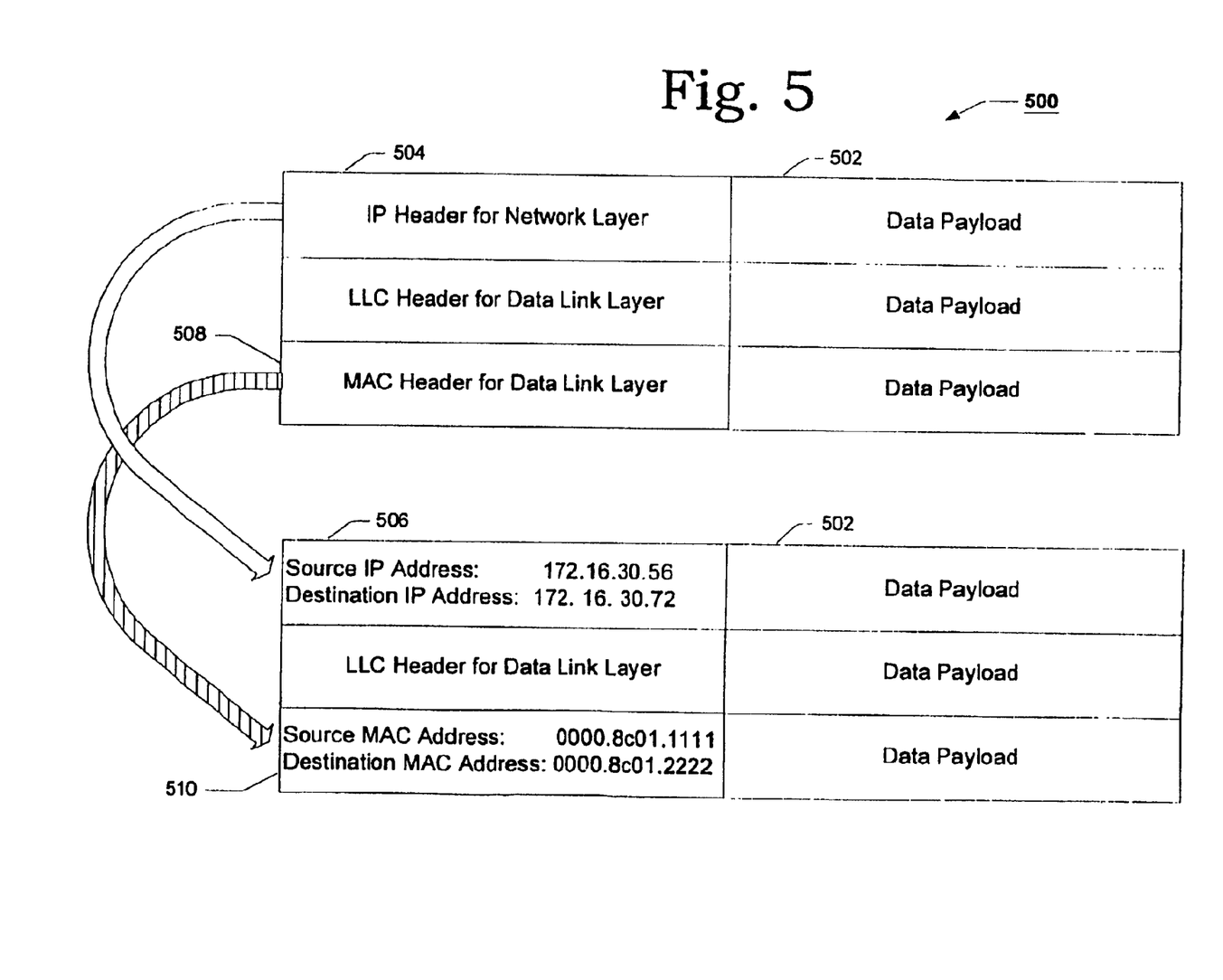
FIG. 5 is a block diagram of example data packets representing protocol layer headers.

FIG. 5 shows an example data packet 500 having a data payload 502 encapsulated with various headers to be used by the various protocol layers of TCP/IP. An IP header 504, 506 contains source IP address and destination IP address fields, containing addresses that may be hashed by the present invention. A MAC header 508, 510 contains source and destination hardware addresses that may be hashed by some embodiments of the present invention instead of or in addition to an IP address. The MAC header 508, 510 may also be used by the present invention to store the protocol processor identifier returned by the hasher.

Figure 6:
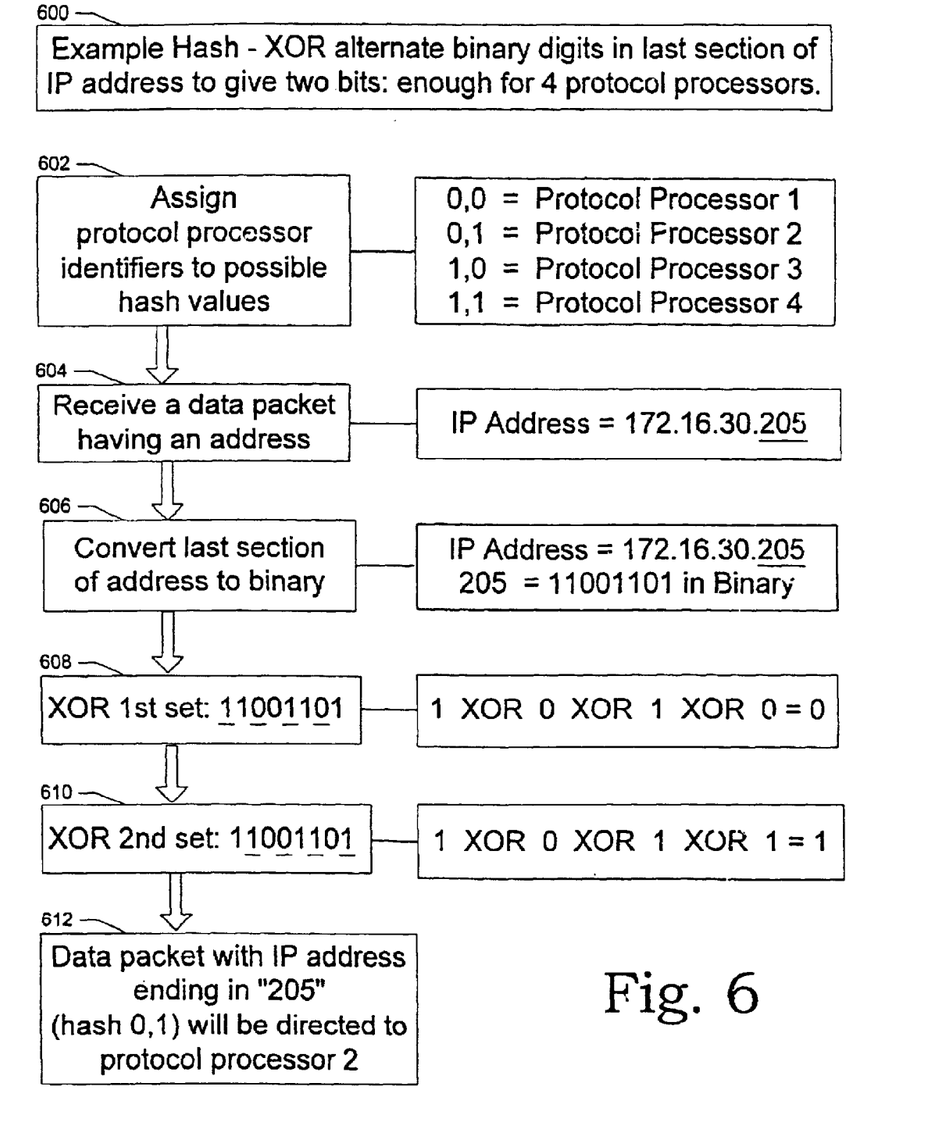
FIG. 6 is a flowchart of one method embodiment of hashing an example IP address.

FIG. 6 shows an example method for performing a hash function 600 to relate an IP address to a particular protocol processor in a switch. Protocol processors may be assigned to identifiers and/or possible hash values 602. Four protocol processors are used in the shown example, requiring two bits to give enough binary combinations for four unique identifiers: 0,0; 0,1; 1,0; and 1,1. A data packet having an address is received 604 and in the shown example, the last section of the address is converted to binary 606 to facilitate the hash function. The example hash function XORs alternate digits of the binary IP address fragment together to give a first bit 608 and XORs the remaining alternate digits of the binary IP address fragment together to give a second bit 610. The first and second bits are used to direct the data packet to a protocol processor 612. An IP address ending in "205" will accordingly result in the two bits "0" and "1" and will be, in this example, directed to protocol processor "2."

In some embodiments, a complete address may be hashed so that a unique complete address will always result in the same hash value. In other embodiments, a partial address may be used to obtain a hash value, for instance when all possible addresses arriving at a switch will always have identical bits except for one section. In the shown example 600, only the last section of an IP address is used to obtain a hash value.

A hash function may directly return an identifier that is the hardware address of a protocol processor. This may be accomplished by selecting a hash function that hashes an IP address directly into a hardware address, or by accommodating the hardware address to substantially match possible hash results. Alternately or in addition to directly hashing one address into another, a hash table may be used.

Figure 7:
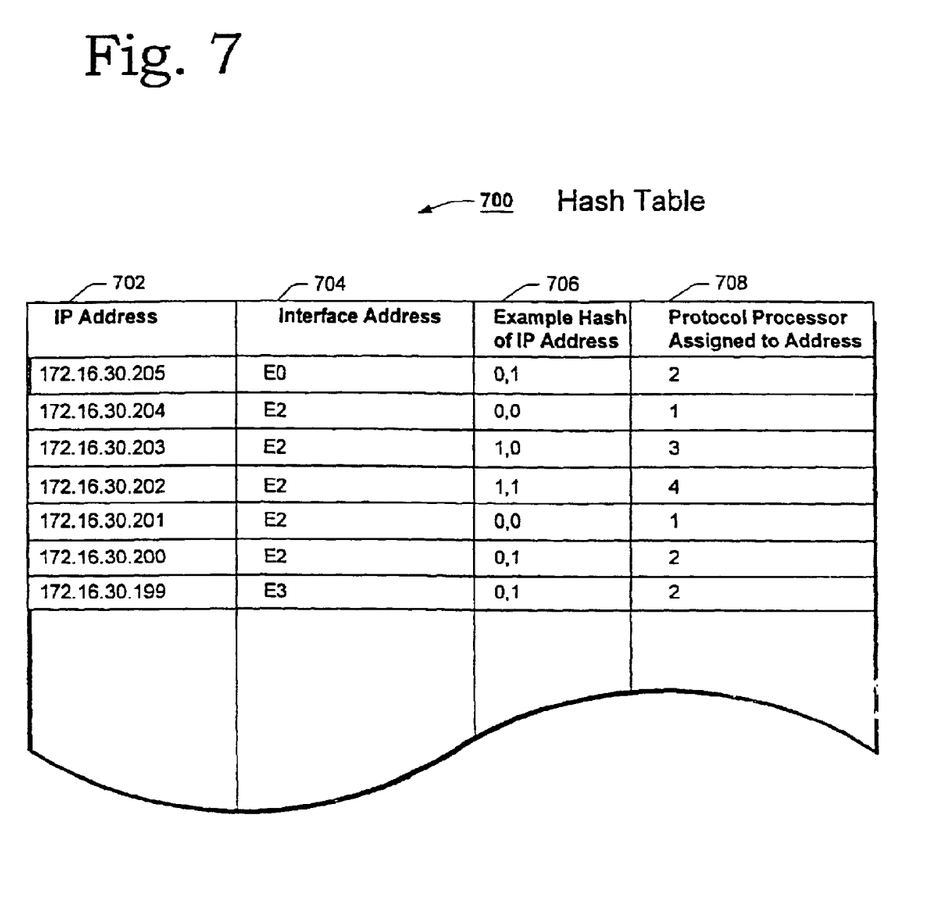
FIG. 7 is a graphical illustration of an example hash table relating IP addresses to hash values.

FIG. 7 shows an example of an optional hash table 700. IP addresses 702 are related to their hash value(s) 706 using the example hash function of FIG. 6. The hash values may be assigned to protocol processors 708 in a switch. A hash table may also relate interface addresses 704, such as port addresses, to the IP addresses 702. In some embodiments of the present invention, a classifier may hash the address of each data packet regardless of whether the address has been processed before, and relate the hash value(s) to a particular protocol processor using a hash table. In other variations, a classifier may build a table of IP addresses and reserve hashing for new data packets having addresses that are not found in the table. The shown example 700 builds a table including IP addresses 702 so that hashing the address of every data packet may be unnecessary. Avoiding the need to hash the address of every data packet may be an advantage in some embodiments, while in other embodiments avoiding a hash table all together by hashing an address directly into a protocol processor address may be an advantage.

Figure 8:
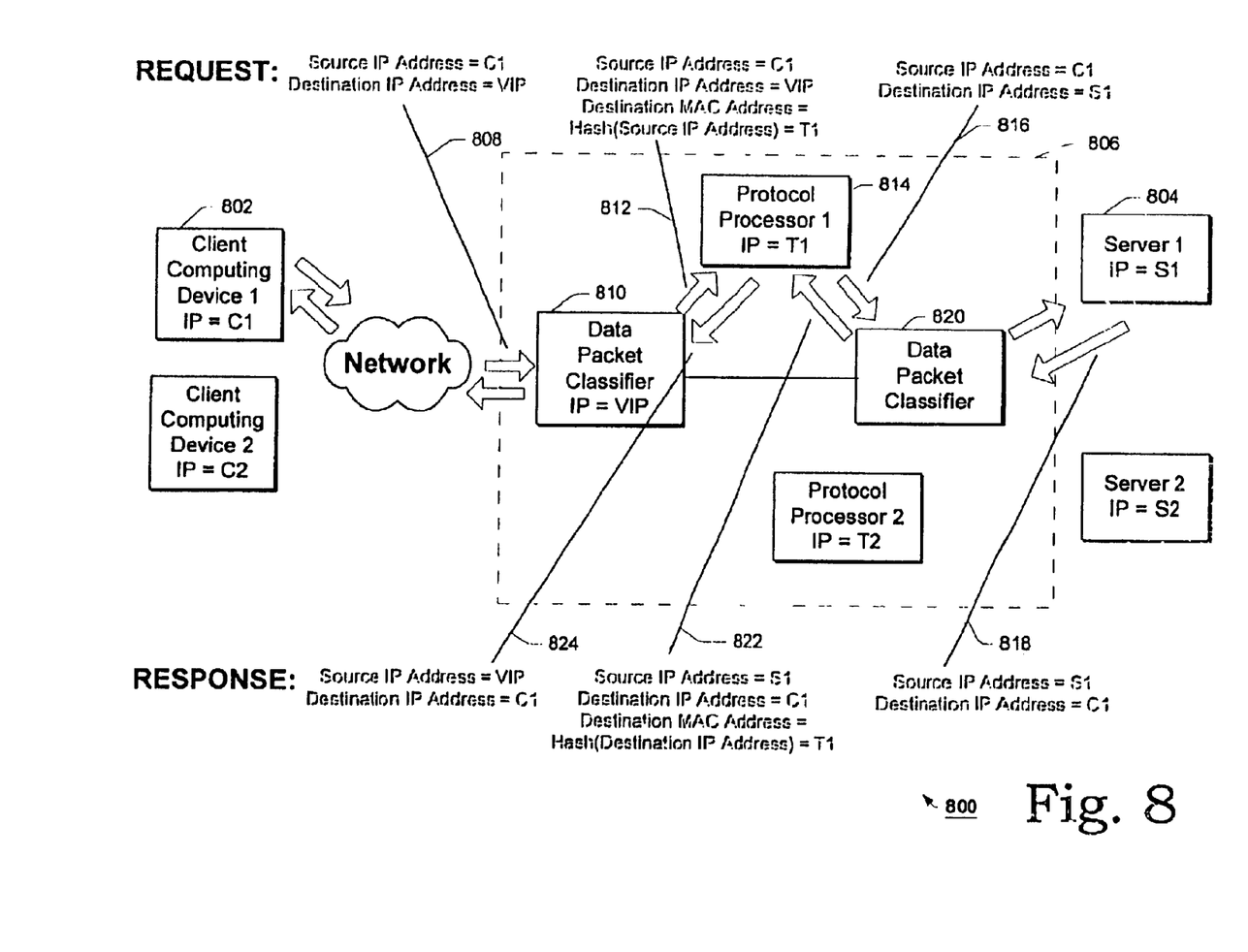
FIG. 8 is a block diagram illustrating a communication flow between server and client computing devices using one embodiment of the present invention.

FIG. 8 shows one example of a data packet exchange 800 between a client computing device 802 and a server device 804 in which classifier(s) 810, 820 of the present invention hash a client IP address to obtain an identifier of a protocol processor 814 regardless of whether the client IP address is in the source IP address 808 or in the destination IP address 818. The client's request data packet 808 arrives at a switch 806 that incorporates the present invention. The data packet 808 includes an IP header containing a source IP address of the client, and a destination IP address. The destination IP address may be that of a server 804 or, in the shown example, may be a virtual IP address of a classifier 810 of the present invention, for instance if previous data packets have been exchanged in the session. The classifier(s) 810 perform a hash function 812 of the source IP address thereby obtaining an identifier, in this case the address, of one protocol processor 814 in the switch 806. An identifier for a protocol processor may be a hardware address, a software IP address, or a combination of both depending on the nature of the protocol processor. The classifier 810 may store the obtained identifier of a protocol processor 814 in a destination MAC address field in the frame of each data packet so that standard switch fabric may transfer the data packet to the identified protocol processor 814. The protocol processor 814 determines a destination for the data packet 816 and transfers the data packet 816 to a classifier, classifier segment 820, port, or other interface.

The destination server 804 responds to the client request by sending a data packet 818 having the server IP address as the source address and the client IP address as the destination address. In the shown example, a classifier or classifier segment 820 hashes the destination address 822, which may be the client IP address if using optional source address preservation. If source address preservation is not used, a different address than the client IP address may be hashed. The protocol processor identifier obtained by hashing an address may be stored in a destination MAC address field in the frame of each data packet, and may be used to transfer the data packet 822 to the same protocol processor 814 used for the client request. In one embodiment, the protocol processor 814 transfers the data packet 824 to a classifier 810, which may use the virtual IP address of the classifier 810 as the source IP address (instead of the server IP address), so that the client will send further requests to the VIP address of the classifier 810.

Figure 9:
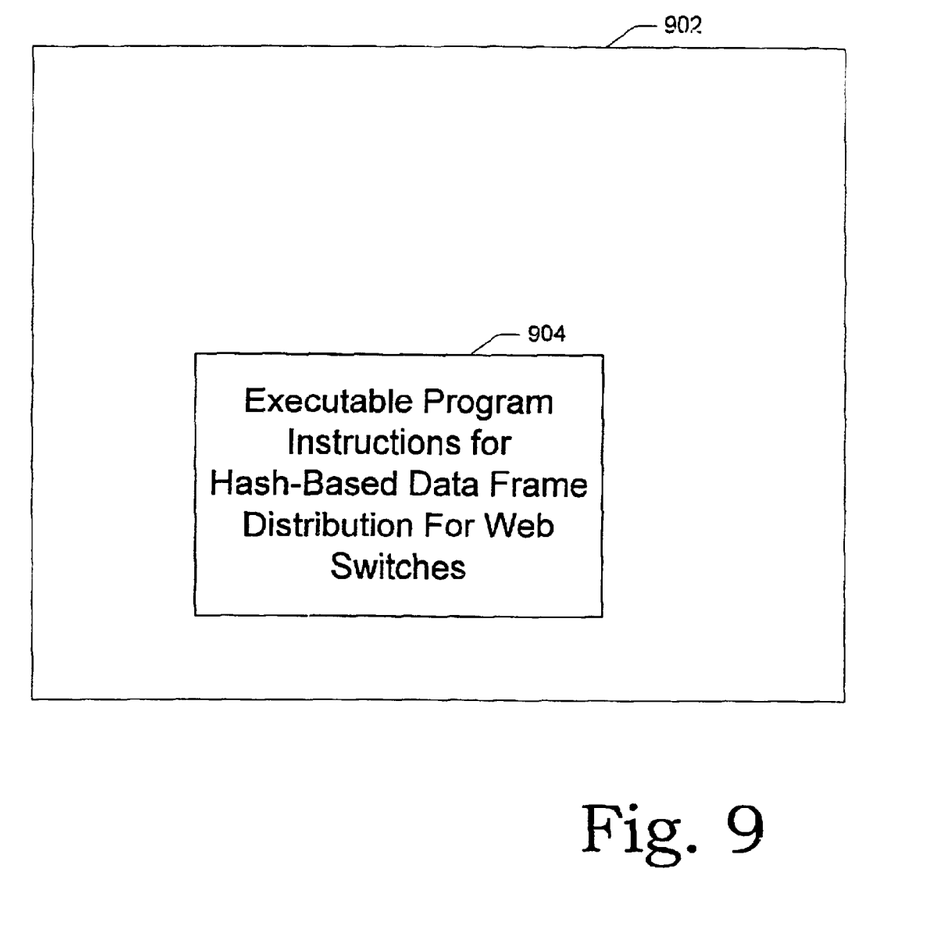
FIG. 9 is a graphical representation of a machine accessible storage medium comprising a plurality of executable instructions including instructions which, when executed, implement one or more of the innovative data packet classifiers, hash-based data frame distributors, and/or methods of the present invention.

FIG. 9 shows a machine accessible storage medium 902 that comprises a plurality of executable instructions 904 including instructions which, when executed, implement one or more of the methods, innovative data packet classifiers, and/or hash-based data frame distributors of the present invention.

Figure 10:
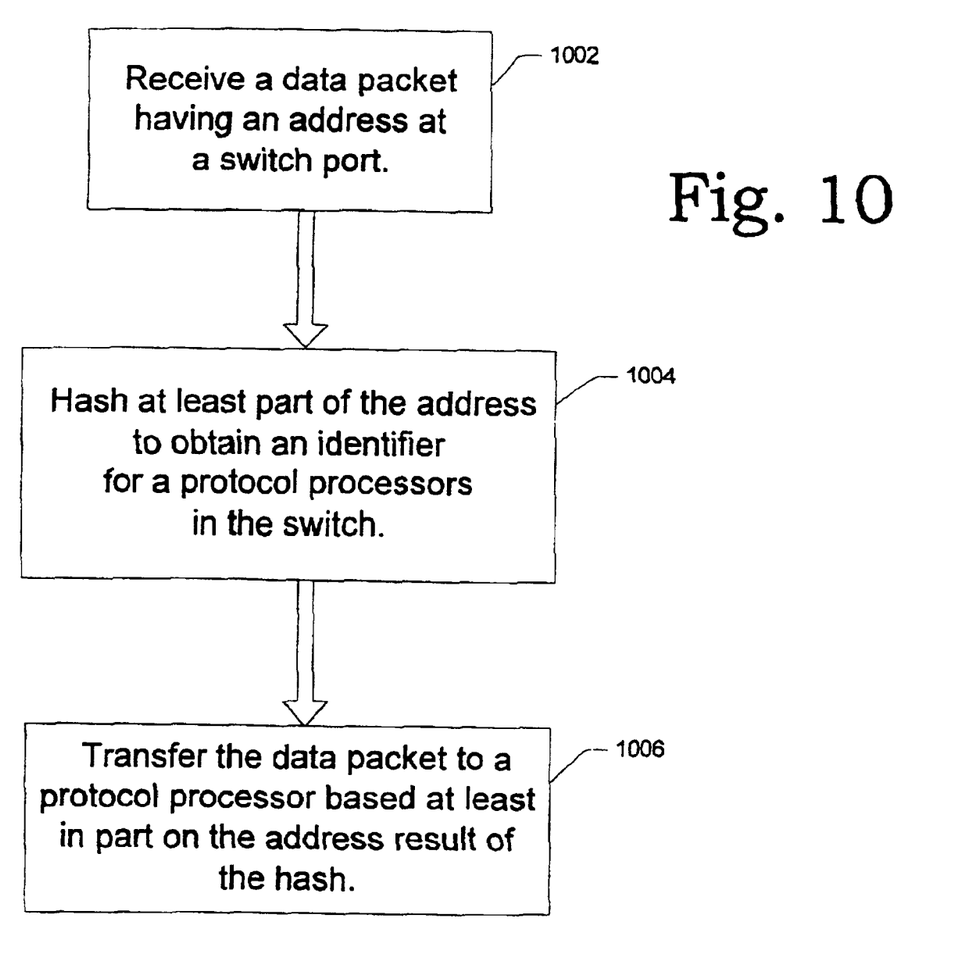
FIG. 10 is a flow diagram of an example method for distributing data packets to protocol processors within a web switch.

FIG. 10 shows one method embodiment of the present invention. The method includes receiving a data packet having an address at a switch port 1002. A hash function is performed on at least part of the address to obtain an identifier, such as an address, of a protocol processor in the switch 1004. A "protocol processor" may be one of a plurality of protocol processors, or may be one part of a single physical or logical protocol processor. The data packet may then be transferred to a protocol processor based on the result of the hash function 1006. In one embodiment of the method, a source address is preserved in each data packet throughout the method and is hashed on both server and client sides of a switch to obtain an identifier for a particular protocol processor. In some variations, the hash function may be performed on any combination of hardware addresses, software addresses, port addresses, and interface addresses to obtain an identifier for a protocol processor in the network switch.

The method is described in its most basic form but additions and deletions could be made without departing from the basic scope. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method, comprising:
   receiving data having an address at a network switch, wherein the network switch has at least one protocol processor wherein the at least one protocol processor includes any combination of application-specific integrated circuits, protocol processing hardware, protocol processing software, subcomponents, and/or subroutines; and
   performing a hash function on at least part of the address to obtain an identifier for a protocol processor.

2. The method of claim 1, wherein the data comprises data frames, and at least part of the address is hashed regardless of where the address resides on each data frame.

3. The method of claim 2, further comprising:
coupling a first device and a second device to transfer data frames through the network switch;
preserving in each data frame an address of only one of the devices; and
hashing at least part of the address preserved on each data frame to obtain an identifier for a protocol processor.

4. The method of claim 1, the performing a hash function further comprising performing a hash function on one section of an IP address.

5. The method of claim 1, the performing a hash function further comprising performing a hash function on at least part of an address using an XOR function.

6. The method of claim 1, the performing a hash function further comprising performing a hash function that converts at least part of an IP address into an identifier for a protocol processor.

7. The method of claim 6, wherein the identifier is a hardware address of a protocol processor.

8. The method of claim 1, the performing a hash function further comprising performing a hash function on at least part of the address and on at least part of an interface address to obtain an identifier for one selected protocol processor in the network switch.

9. An apparatus, comprising:
an input port; and
a classifier, coupled to the input port, to receive data frames from a data network through the input port and to hash at least a subset of an address within each data frame to identify a protocol processor to receive the data frame the classifier further comprising a hasher to hash at least a subset of the address regardless of where the address resides in a data frame.

10. The apparatus of claim 9, the hasher further comprising an XOR function.

11. The apparatus of claim 9, the hasher to perform a hash on the least significant bits of an address.

12. An apparatus, comprising:
a machine-readable medium that provides instructions that cause at least one electronic circuit to perform a hash function on an address of data frames to identify a protocol processor in a network switch to receive the data frames wherein the protocol processor includes any combination of application-specific integrated circuits, protocol processing hardware, protocol processing software, subcomponents, and/or subroutines.

13. The apparatus of claim 12, further comprising instructions to preserved the same address on data frames to be sent between a first device and a second device and to hash the same address on each data frame to obtain an identifier for a particular protocol processor regardless of where the address resides on each data frame.

14. The apparatus of claim 12, the hash function to perform a hash function on at least part of the address and on at least part of an interface address to obtain an identifier for a protocol processor in the network switch.

15. The apparatus of claim 12, wherein the hash function is performed using an XOR function.

16. A method, comprising:
receiving a data frame having a client IP address and a server IP address at a port of a network switch, wherein the network switch has at least one protocol processor wherein the at least one protocol processor includes any combination of application-specific integrated circuits, protocol processing hardware, protocol processing software; and
performing a hash function on the client IP address to obtain an identifier for a protocol processor in the network switch.

17. The method of claim 16, further comprising:
coupling a first device and a second device to transfer data frames through the network switch;
preserving the client IP address in a source IP address header field in data frames sent from a client to a server through the network switch;
preserving the client IP address in a destination IP address header field in data frames sent from the server to the client through the network switch; and
hashing at least part of the client IP address preserved on each data frame to obtain an identifier for a protocol processor.

18. The method of claim 16, the performing a hash function further comprising performing a hash function on the address and on an interface address to obtain an identifier for one selected protocol processor in the network switch.

19. An apparatus, comprising:
at least one classifier coupled to at least one network switch to send and receive data frames having an address;
at least one protocol processor coupled to the at least one classifier wherein the at least one protocol processor includes any combination of application-specific integrated circuits, protocol processing hardware, protocol processing software; and
a hasher coupled to the at least one classifier to obtain an identifier of a protocol processor by hashing at least part of the address.

20. The apparatus of claim 19, wherein the address is a client address, each classifier to perform client address preservation and hash the client address in a data frame regardless of whether the client address is the source address or the destination address.

21. The apparatus of claim 19, the classifier further comprising a hash table having at least one identifier for each protocol processor; the classifier to relate each data frame to an identifier for one particular protocol processor.

22. The apparatus of claim 19, each data frame further comprising a destination media access control field, each classifier to assign each data frame to a particular protocol processor by storing an identifier for a protocol processor from the hash table in a destination media access control field of each data packet frame.

23. The apparatus of claim 19, wherein one or more protocol processors are application-specific integrated circuits.

24. The apparatus of claim 19, wherein the classifier performs a hash function on the address and on an interface address to obtain an identifier for one selected protocol processor in the network switch.

25. A data frame classifier for a network switch, comprising:
a client IP address reader to read the client IP address regardless of which header field in each data frame is used to store the client IP address;
a hasher to obtain an identifier for a protocol processor in the network switch by hashing at least part of the client IP address.

* * * * *